Dec. 2, 1930.  P. A. CELANDER  1,783,405
LIQUID FUEL BURNING DEVICE FOR DOMESTIC PURPOSES
Filed July 13, 1929   7 Sheets-Sheet 1
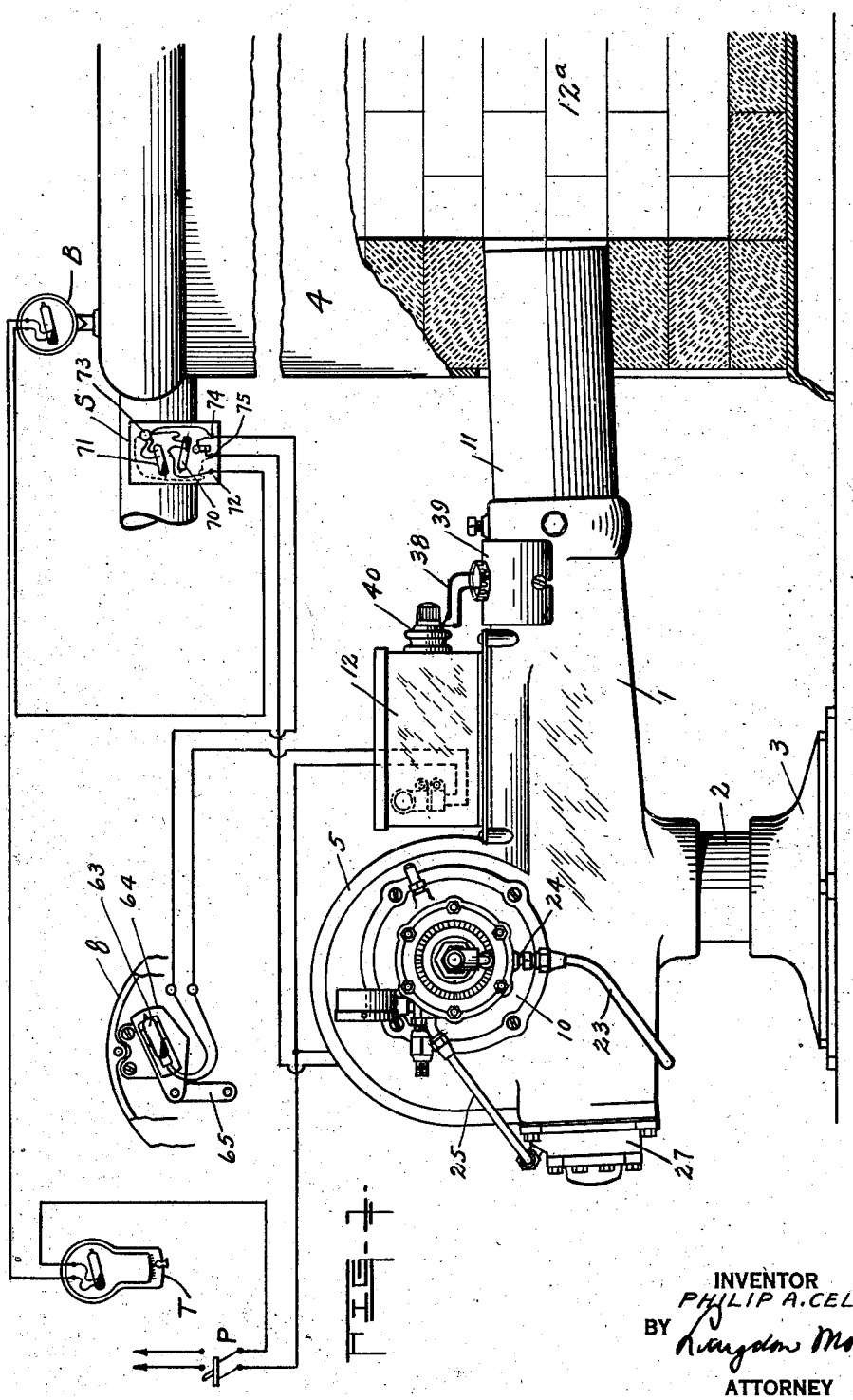
INVENTOR
PHILIP A. CELANDER
BY
ATTORNEY

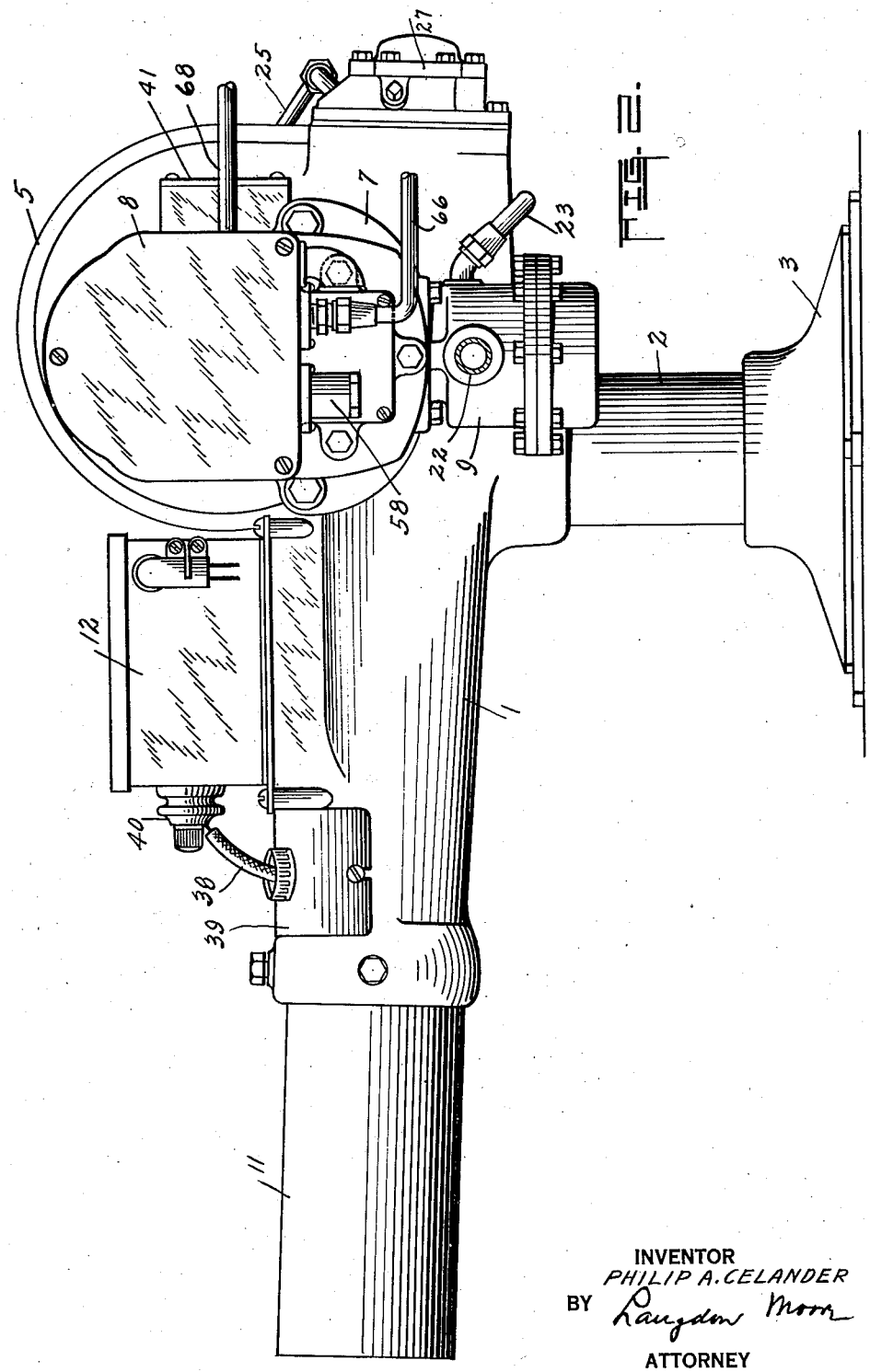

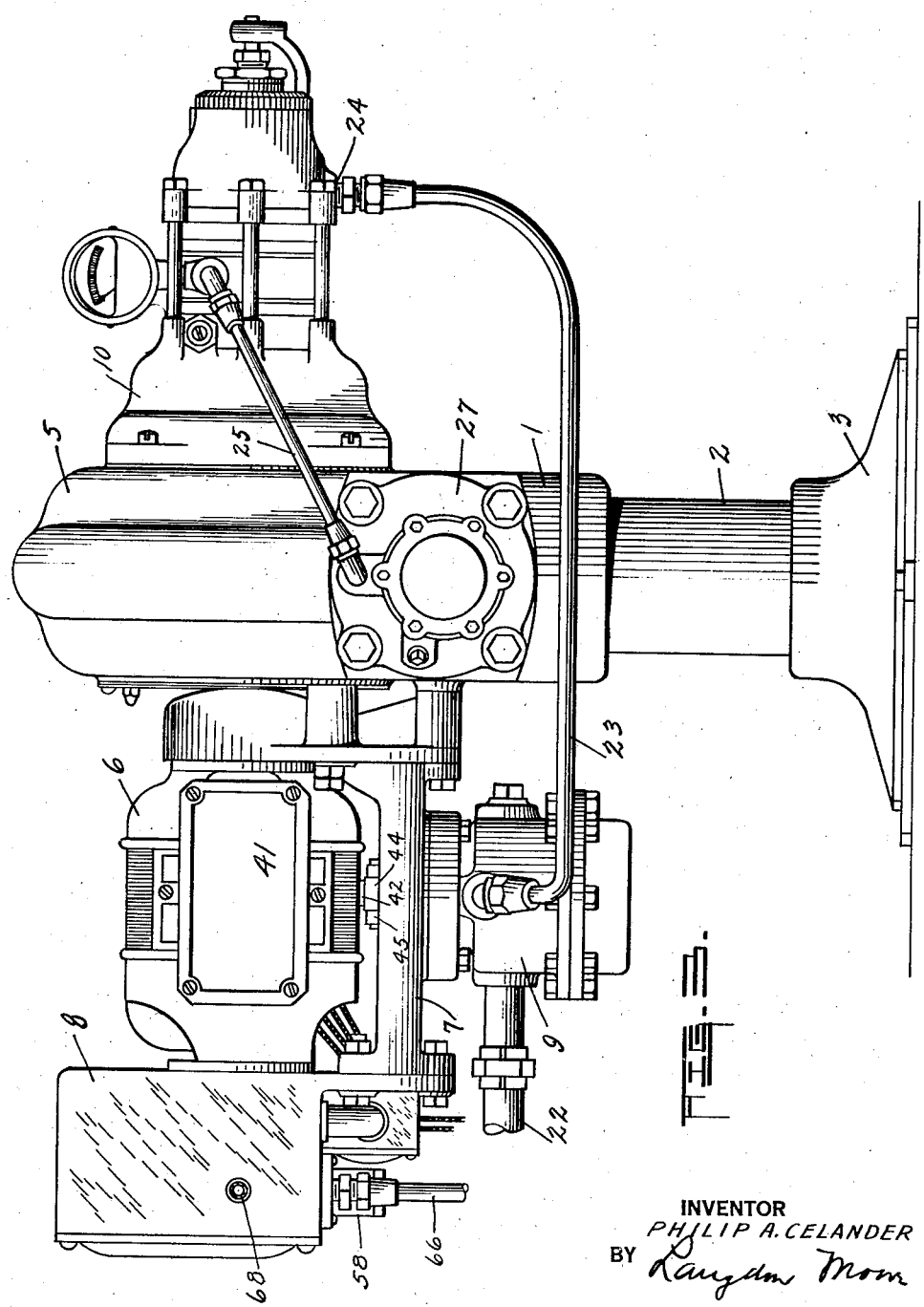

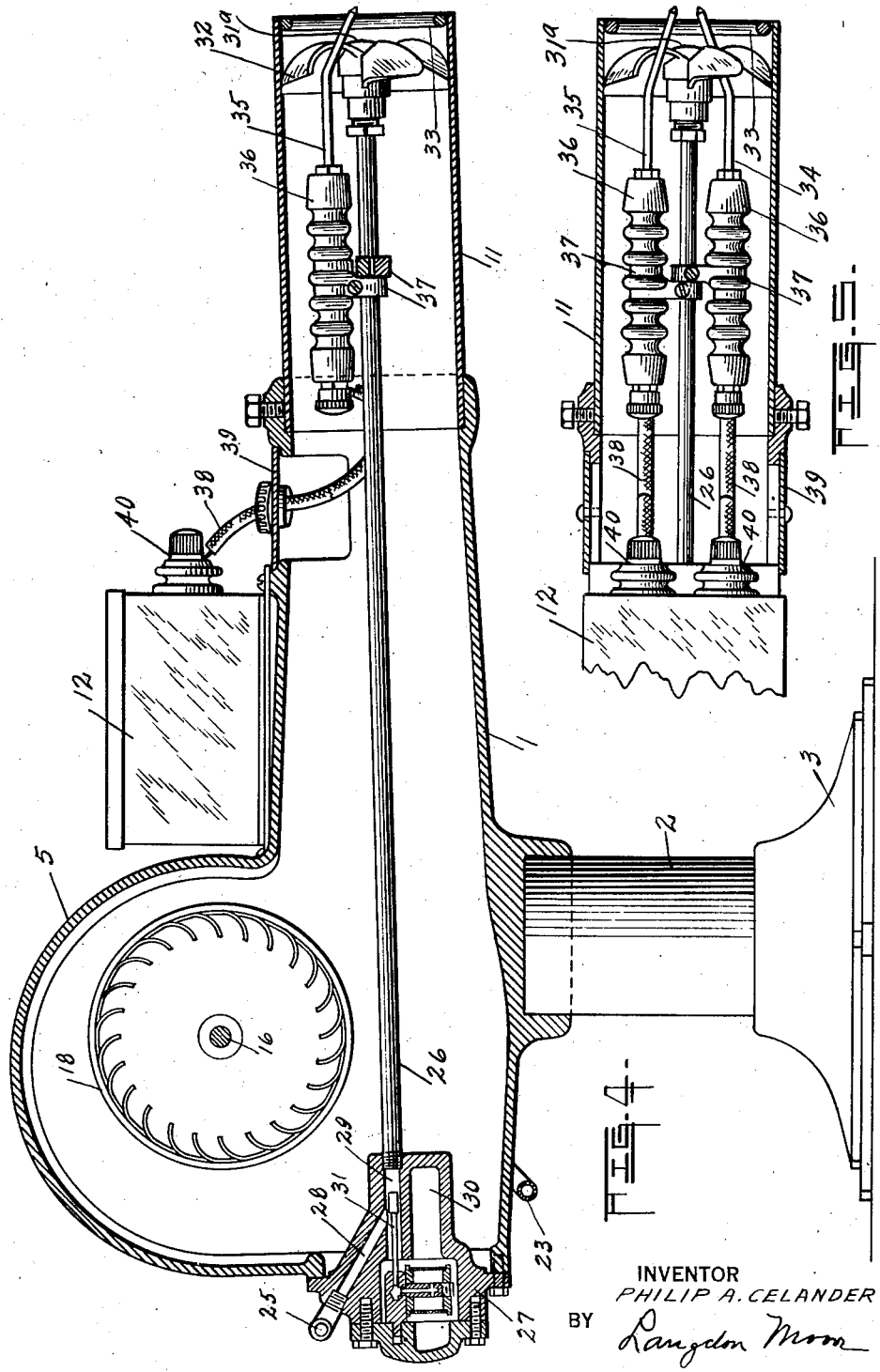

Dec. 2, 1930.　　　　P. A. CELANDER　　　　1,783,405
LIQUID FUEL BURNING DEVICE FOR DOMESTIC PURPOSES
Filed July 13, 1929　　　7 Sheets-Sheet 5
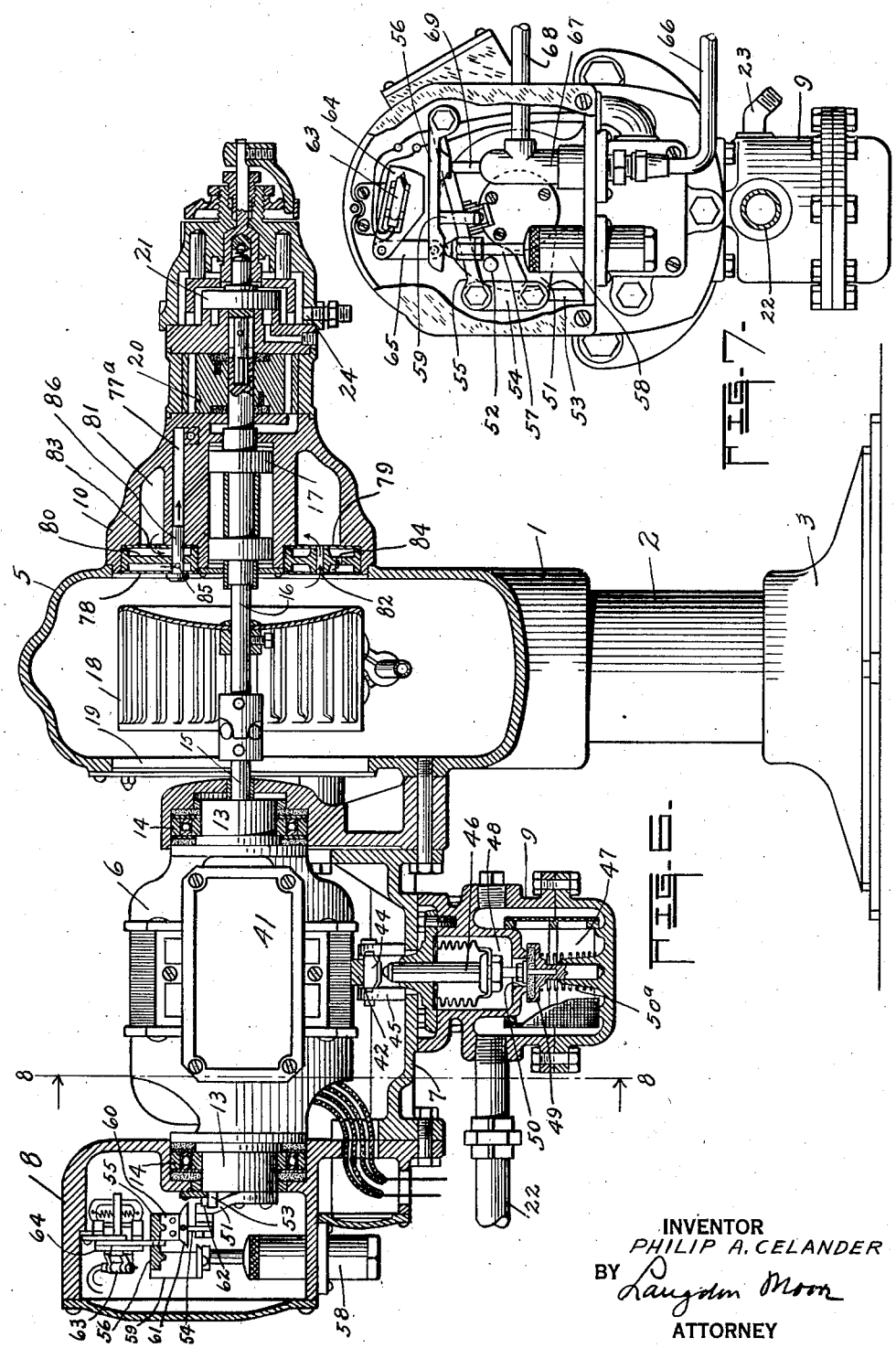
INVENTOR
PHILIP A. CELANDER
BY
ATTORNEY

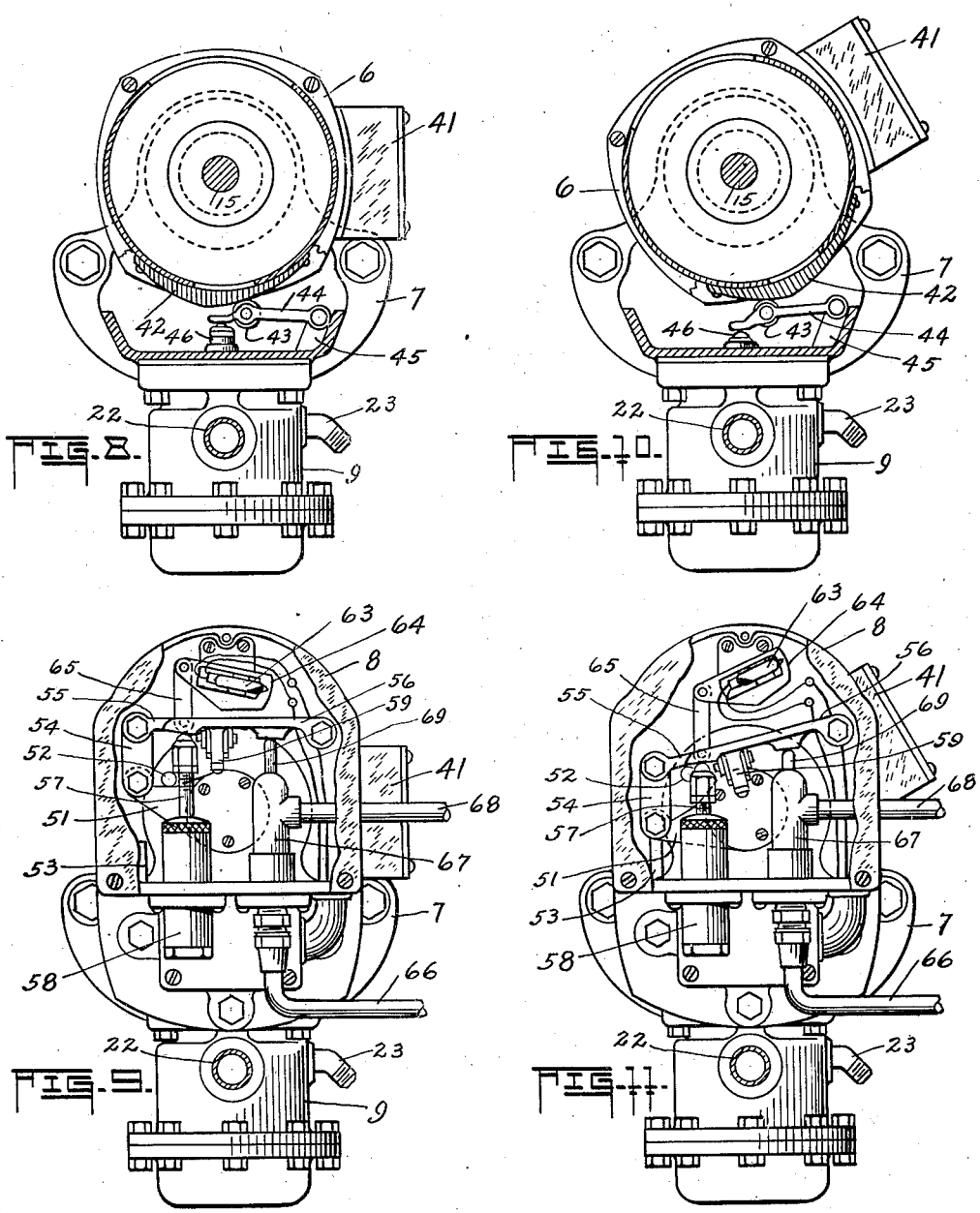

Dec. 2, 1930. P. A. CELANDER 1,783,405
LIQUID FUEL BURNING DEVICE FOR DOMESTIC PURPOSES
Filed July 13, 1929 7 Sheets-Sheet 7

INVENTOR
PHILIP A. CELANDER
BY Langdon Moore
ATTORNEY

Patented Dec. 2, 1930

1,783,405

UNITED STATES PATENT OFFICE

PHILIP A. CELANDER, OF BLOOMINGTON, ILLINOIS, ASSIGNOR TO WILLIAMS OIL-O-MATIC HEATING CORPORATION, OF BLOOMINGTON, ILLINOIS, A CORPORATION OF ILLINOIS

LIQUID-FUEL-BURNING DEVICE FOR DOMESTIC PURPOSES

Application filed July 13, 1929. Serial No. 378,053.

This invention relates to improvements in liquid fuel burning devices for domestic purposes and more particularly to the construction of an oil burner of the same general type as disclosed in the prior application of Williams Serial No. 284,545, filed June 11, 1928.

It is an object of this invention to construct a device of this character which will be compact in form, efficient in operation and eliminate as far as possible the exposure of parts which may be damaged or rendered inoperative.

It is also an object of this device to provide a control mechanism therefor which is actuated by the natural impetus occasioned by the starting of the motor, and by the arrangement of the fan and construction of the discharge and the draft tube to eliminate some of the noise heretofore due to the combustion of the fuel in the combustion chamber of the furnace or heater to which the oil burner is attached.

With these and other objects in view reference is made to the accompanying sheets of drawing which illustrate preferred forms of this invention, yet it is to be understood that minor detail changes may be made therein without departing from the scope thereof.

In the drawing:
Figure 1, is a view in side elevation of this improved oil burner as installed in connection with a conventional form of furnace or heater usually employed in the heating system of dwellings, said heater being partially in section and partially in side elevation, and this view also includes a wiring diagram illustrating the connection between the motor and ignition system of the oil burner and commercial electric light circuit of the dwelling.
Figure 2, is a view in side elevation looking at the side opposite that illustrated in Figure 1.

Figure 3, is a view in rear elevation of the burner mechanism illustrated in Figure 1.
Figure 4, is a view in central longitudinal vertical section of the burner mechanism illustrated in Figure 1, with parts illustrated in side elevation.

Figure 5, is a detailed view in central horizontal section of the right hand end of Figure 4 illustrating the burner assembly in full lines.

Figure 6, is a view similar to Figure 3, with parts illustrated in vertical section in the plane of the axis of the motor shaft and with parts in side elevation.

Figure 7, is a detailed view in end elevation of the left hand end of Figure 6, with the end cover of the control box broken away and illustrating the control parts in the positions assumed during the normal running or operation of the oil burner after the fuel has been ignited.

Figure 8, is a detailed view partly in section and partly in side elevation taken on the line 8—8, Figure 6, looking in the direction of the arrow illustrating the position of the motor casing and oil valve stem when the motor is at rest.

Figure 9, is a detailed view in end elevation similar to Figure 7, illustrating the parts of the control mechanism assumed when the motor is at rest.

Figure 10, is a view similar to Figure 8, illustrating the position assumed by the motor casing after the starting impetus has been imparted and the motor is normally running.

Figure 11, is a view similar to Figure 9, illustrating the position of the control parts assumed when the motor casing first assumes the position shown in Figure 10, and illustrates the ignition circuit closed.

Figure 14, is a detailed view in vertical central section of the dash pot.

Figure 12:
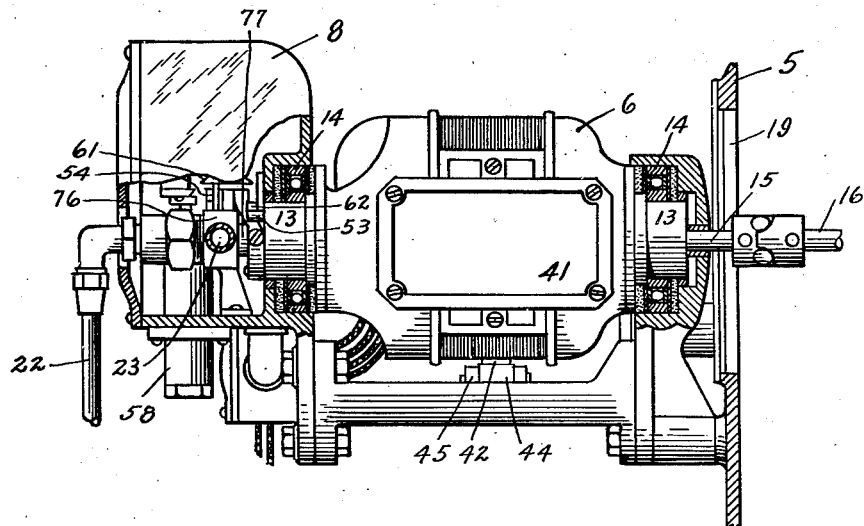
Figure 12, is a detailed view in end elevation of the motor casing and control box carried thereby with the control box casing broken away to illustrate a modified means of controlling the oil valve by the initial impetus of the motor in starting.

As shown in Figures 1, 2 and 3 the operating parts of the oil burner are contained within or are supported upon a main casing 1, so balanced that it may be adjustably supported upon a cylindrical column 2, extending upward from a circular base 3 designed to rest upon the floor which also supports the heater 4, of any commercial design employed in the heating system of a dwelling or building. The rear portion of the casing 1 is extended upward to form a fan housing 5 for a circular fan, the operating shaft of which passes through said housing at right angles to the longest dimension of the casing 1. The motor for operating the fan is contained within a casing 6, mounted in a bracket 7, secured at one side of the fan housing and supported upon the main casing 1, which bracket 7, at its outer end supports a control box 8 and a central depending oil valve casing 9. Surrounding an extension of the motor shaft upon the side of the fan housing opposite the motor is secured a housing 10 for supporting the mixture and metering pumps. Extending forward from the main casing 1 and at right angles to the motor shaft is an adjustable blower pipe 11, which is adapted to be received within the bricking of the combustion chamber 12ª of the heater, as shown in Figure 1. Upon the upper side of the housing 1 and in advance of the fan housing 5, a transformer or ignition device 12 is supported and attached.

Referring to Figure 6, it is seen that the motor casing 6, is provided with trunnions 13 which are mounted in bearings 14, carried upon the bracket 7 and the motor shaft 15 is directly connected to the fan operating shaft 16 which shaft passes through the opposite side of the fan housing 5 and is received within the bearings 17 provided therefor in the housing 10. The fan 18 when in operation draws air into its housing 5 through a circular aperture 19 provided in the side of said housing adjacent the motor casing trunnion bearing supported on the bracket 7, and forces said air out through the main casing 1, to be discharged at the end of the blower pipe 11, into the combustion chamber.

The fan operating shaft 16 extends through its bearings 17 in the housing 10 and there beyond to operate a mixing pump 20 and metering pump 21 of the same general construction as illustrated in the prior patent to Williams No. 1,451,798 dated April 17, 1923, and which are contained in suitable housings secured to the housing 10, mounted upon the side of the fan housing 5. A pipe 22 conducts the liquid fuel or oil from the tank or source of supply, not shown, to the oil valve housing 9 depending from the under side of the bracket 7, from which the liquid fuel oil is conducted by pipe 23 to the inlet 24, of the metering pump 21. The liquid fuel or oil is delivered in pre-determined quantities to the mixing pump 20 where it is mixed with a certain proportion of air as described in said prior patent and this mixture of oil and air is delivered from the pump 20 through pipe 25 to the mixture pipe 26 of the burner assembly, which pipe is mounted within the main casing 1 and centrally of the blower pipe 11, as shown in Figure 4. This burner assembly is of commercial construction. The mixture pipe 25 from the mixture pump is connected to the mixture pipe 26 of the burner assembly through a casting 27 mounted upon the end of the main casing 1 opposite the blower pipe 11. The end of the mixture pipe 26 of the burner assembly engaging the casting is lower than the discharge end of said pipe and is connected to the pipe 25 leading from the mixture pump by an inclined passage 28, which joins a passage 29 in axial alignment with the burner assembly pipe 26. This passage 29 communicates with a reservoir or collecting basin 30, provided in the casting 27 therebelow, so that when the mixture pump ceases to operate the liquid fuel or oil in the burner assembly pipe 26 will drain into the reservoir 30. A smaller pipe 31 is mounted axially of the passage 29, one end of which terminates between the inclined passage 28 and connecting with the burner assembly pipe 26 and the other end opens into the reservoir 30 so that as the mixture pump 30 is operated the mixture passing through pipe 25, passage 28 and burner assembly pipe 26 will by induction remove the liquid fuel or oil collected in the reservoir 30.

Upon the end of the burner assembly pipe 26 adjacent the discharge end of the blower pipe 11, a nozzle 31ª and air spiral 32 are mounted which are substantially of the same construction and mounted in substantially the same manner as disclosed in the prior patent, to Williams 1,606,859, dated November 16, 1926. The mixture of oil and air under pressure is delivered by the mixture pump 20, to the nozzle 31ª and is discharged in the form of a conical spray from the discharge orifice in the nozzle. The air under pressure from the fan 18, passes through the main casing 1 and blower pipe 11, and through the air spiral 31 which imparts a twisting movement to it. The discharge end of the blower pipe 11 is contracted or provided with an annular abutment such as the ring 33 shown in Figures 4 and 5. The outer strata of the column of air passing through the blower pipe 11 and air spiral 32 encounters this abutment and is deflected sharply in the direction of the axis of the blower pipe 11, thereby causing all of the air issuing with a spiral motion through the air spiral 32 to impinge upon the conical spray issuing from the discharge nozzle of the burner assembly causing an intimate mixture of the additional air passing through the blower pipe 11 with the oil issuing in the form of a spray from the burner assembly nozzle.

In order to ignite this fuel mixture formed adjacent to the discharge end of the blower pipe 11, two electrodes 34 and 35 are mounted in long tubular insulators 36, which in turn are secured by brackets 37 to the burner assembly pipe 26 and are rigidly supported thereon by the elongated insulators. The forward ends of these electrodes are bent toward each other and terminate a sufficient distance apart so that when an electric current is passed therethrough a spark will jump from one electrode to the other and are so positioned in relation to the discharge nozzle of the burner assembly that the electric spark will ignite the mixture of oil and air formed by the meeting of the additional air from the blower pipe 11 and the conical spray of oil and air issuing from the discharge opening of the burner assembly nozzle. The rear ends of these electrodes 34 and 35 are connected as they leave the inner ends of the tubular insulators to flexible leads 38 which pass through a removable cover 39 upon upper surface of the main casing 1 and are connected to the high tension binding posts 40 of the transformer or ignition device 12.

Referring to Figures 6, 8 and 10, it is seen that the motor is contained within a casing 6 which casing is provided with trunnions 13 rotatably mounted within bearings 14 upon the bracket 7, the motor shaft 15, passing through an aperture provided therefor in the trunnion and bracket adjacent the motor housing 5. It is preferable to secure upon the outer surface of the casing 6, a counter weight 41, which will always cause the casing to balance in the same position when the motor has ceased operating with relation to the bracket 7. The underside of the casing 6 is provided with a cam 42, which is normally engaged by a roller 43 upon a lever 44, pivoted at one end to an arm 45, rigidly supported upon bracket 7. The free end of the lever 44 is arranged to engage the end of a reciprocating valve stem 46, which is mounted vertically within the oil valve casing 9 and is so constructed that when the oil valve is closed the stem 46 extends upward above the casing and when depressed will open the valve to allow the passage of oil from the pipe 22, through the casing and pipe 23 to the metering pump 21. When the power circuit is closed through an electric motor contained within a casing mounted upon trunnions, such as shown and described herein, and upon the initial rotation of the motor shaft a movement in the opposite direction will be imparted to the casing and thereafter maintain the casing in the position to which it has been moved until the power circuit is broken and as the motor shaft ceases to operate the motor casing will return to the position occupied before the power circuit is closed. The force of reaction causes the casing to rotate as the magnetic field which causes the rotor to rotate reacts on the normally stationary casing which carries the field coils of the motor and since the casing is free to rotate through a short arc such reactive force causes rotation. The cam 42 upon the under side of the motor casing 6, is so shaped that when the motor is at rest the oil valve may close and the free end of the lever 44 be moved upward thereby as shown in Figure 8, and when the power circuit is closed the initial impetus imparted by the rotation of the motor will cause the cam to engage through roller 43 and end of lever 44 the upper end of the valve stem 46 and depress the same to open the oil valve, as shown in Figure 10. When the motor ceases operating the casing returns to the position illustrated in Figure 8 and allows the oil valve to close.

Figure 6 illustrates the oil valve casing in section and discloses a preferred type of oil valve mounted therein. The oil inlet pipe 22 opens into the lower chamber 47 of the oil valve casing containing a circular strainer and, when the oil valve stem 46 is depressed, the oil passes therethrough and into the upper chamber 48, and thence out through the pipe 23. The oil valve stem 46 passes through the upper closure of the oil valve casing 9 and is preferably provided with a bellows stuffing box, as shown. The lower end of the stem 46 is secured to a valve head 49 normally held against its seat 50 in the partition between the upper and lower chambers by the coil spring 50$^a$ together with the pressure of the oil in the pipe 22, so that when the stem is depressed the valve will be open and oil can pass from one chamber to the other.

The control mechanism contained within the control box 8 mounted on the bearing for the trunnion 13 supported on the outer end of the bracket 7, is for controlling the operation of the ignition device and is also actuated by the initial impetus of the starting of the motor causing a rotated movement of the casing 6. As illustrated in Figures 6, 7, 9 and 11, the outer vertical extremity of the exterior trunnion 13 is provided with an actuating arm 51 in the form of a plate secured to said outer surface, as shown, and having the portion 51 of said plate extending beyond the circumference of the trunnion. This actuating arm 51 is adapted to oscillate between two posts 52 and 53 secured to the casing, which may be adjusted to limit the movement imparted to the casing 6 upon the starting and stopping of the motor. The outer end of this actuating arm 51 is connected by a pivoted link 54 to the free end of a pivoted lever 55 so that as the motor starts and stops an upward and downward rotation will be imparted to this lever. The pivot of this lever is mounted upon the casing 8 and this pivot also mounts another lever 56 extending in the same direction as the first, but of less strength, the free end of which is adapted to engage upon its under side the upper end of the piston stem 57 of a dash pot 58 supported in the casing thereunder. These two levers 55 and 56 are detachably connected to each other by depending arms 59 and 60 of which the arm 59 on the shorter lever 56 is provided with a rigid contact member and the arm 60 on the lever 55 is provided with a pivoted engaging member 61 adapted to engage the fixed member upon the shorter lever and cause the shorter lever to move downward with the longer lever until the pivoted member 61 thereon engages a stop 62 upon the casing 8, whereupon the continued downward movement of the longer lever releases the shorter lever.

A mercury tube switch 63 in the ignition circuit is mounted upon a centrally pivoted plate 64 carried upon the upper portion of the casing 8 one end of which plate is connected by a pivoted link 65 to the free end of the shorter lever 56 in such a manner that when the shorter lever is in its uppermost position the circuit is broken through said switch and when in its lowermost position the circuit is closed.

Figure 9 illustrates the position assumed by these parts when the motor is at rest and from which it is seen that the actuating arm 51 is in its uppermost position causing the lever 55 connected thereto by the pivoted link 54 to assume a horizontal position and the shorter lever 56 is caused to assume a similar position by the spring pressed piston stem 59 of the dash pot 58 being in its extended position and the mercury tube switch 63 is in position to break the ignition circuit. When the power circuit is closed to the motor, the initial impetus imparted to the casing causes the actuating arm 51 to assume the position shown in Figure 11 and through the catch mechanism 59, 60 and 61 depresses the shorter lever 56 which through the connecting link 65 rotates the mercury tube switch 63 to closed position. Just before the actuating lever 51 reaches its lowermost position, the pivoted catch member 61 is disengaged from the shorter lever 56 and thereby allows the spring pressed plunger 57 of the dash pot to return the shorter lever 56 to the position shown in Figure 7, whereby the mercury tube switch 63 is tilted to break the ignition circuit. This latter position is the normal running position.

Figures 1, 4 and 5 illustrate a direct spark ignition device in which the spark ignites the fuel mixture. There are times where it is desired to ignite a gas pilot by the spark, which will in turn ignite the fuel mixture, and in such a case an automatic gas valve connected with an independent gas supply conducts the gas to a point adjacent the burner nozzle so that when the same is ignited it will ignite the fuel mixture as shown and described in the prior patent to Williams 1,711,436 dated April 30, 1929. If a combined gas and spark ignition device is desired in the burner forming the subject matter of this application, an automatic gas valve may be actuated by the shorter lever and to this end in Figures 7, 9 and 11 an automatic gas valve is illustrated. A pipe 66 leading from an independent source of gas supply is shown connected to the under side of a casing 67 arranged within the control box 8 and a discharge pipe 68 from this casing may be led to a point in proximity to the electrode as described in said prior patent. A spring pressed valve normally closes the passage in the casing 67 between the two gas pipes. The stem 69 from the valve extends upwardly through the top of the casing 68 and normally engages the underside of the shorter lever 56 when the motor is at rest. When the motor starts the shorter lever 56 depresses the valve stem 69, opening the gas valve, at the same time said lever closes the ignition circuit, and as the shorter lever 56 is released and returns to its horizontal position the gas valve will automatically close in the same manner as described in the said prior patent.

Figure 1, illustrates a wiring diagram in which the motor and control circuits are connected or disconnected to the commercial electric circuit by a pull switch P, shown in the upper left hand corner of the drawing. The incoming current from the commercial circuit passes first through a room thermostat T, of commercial construction, and thence through a boiler control B, of commercial construction, and from thence to a stack safety S, of commercial construction, operated by the heat of the gases of combustion passing from the combustion chamber to the chimney or flue. As shown this stack safety includes two mercury tube switches 70 and 71, one of which is in closed position, while the other is in open position. The position shown is that assumed when the circuit has been closed through the room thermostat but the fuel has not as yet ignited. The mercury tube switch 70 is normally maintained in closed position unless the room thermostat calls for heat and the burner fails to ignite or if for any reason the burner flame fails after ignition, and under these conditions the switch 70 is released and the circuit broken therethrough. This construction is a commercial article and the safety switch 70 is normally held in closed position by a thermally actuated releasing device. The other switch 71 is actuated by a thermostatic coil position within the stack of the furnace and responsive to the heat produced by the combustion of the liquid fuel. This is also a commercial device and the switch 71 is normally in the open position when the furnace is cold. When the liquid fuel is ignited the heat therefrom causes this switch to assume the closed position and remain closed as long as the fuel burns but returns to open position when the flame becomes extinguished. The current of the commercial line when the pull switch P is closed passes through the room thermostat T, when the switch therein is closed, thence through the boiler control B and from thence to the binding post 72 upon the stack safety S. From this binding post it passes through the mercury switch 70 to the binding post 73, and with switch 71 in the open position it passes from binding post 73 to the binding post 74 on the lower edge of the panel. There the current divides, part passing through the thermal switch releasing element to the binding post 75 and from thence to the motor of the oil burner, through the motor, and back to the main line, while the other portion of the current passes from the binding post 74 through the ignition switch 63 carried in the control box 8, which switch is normally in the closed position while the burner is inoperative and is caused to slowly assume the open position as heretofore described after initial operation of the motor, and from thence to the transformer 12, and from the transformer 12 back to the commercial line. It is thereby seen that when the room thermostat closes the burner motor is started and at the same time the ignition device is energized. The starting of the motor will deliver the liquid fuel and air to the combustion chamber and, if the same is ignited during the limit of operation of the ignition device, the heat from the flame will cause the stack safety switch 71 to close whereby the current from binding post 73 will pass through the switch 71 and from thence to the binding post 75, shunting out the ignition device and also the thermal actuating release member of switch 70, and the current will pass directly from binding post 75 to the motor. Should the fuel fail to ignite initially or should the flame fail after initial ignition the combustion chamber will remain, or quickly become, cool whereby the switch 71 either remains in the open position or will quickly assume the open position and the current passing through the thermally actuated release mechanism will release the switch 70 and cause it to break the commercial circuit returning to the motor and ignition device.

Figure 13:
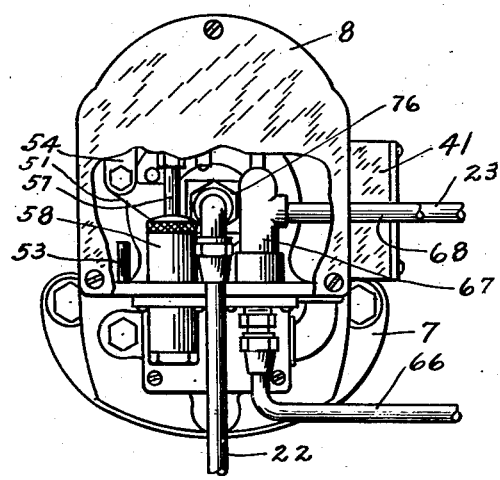
Figure 13, is a detailed view in end elevation of Figure 12.
Figure 74:
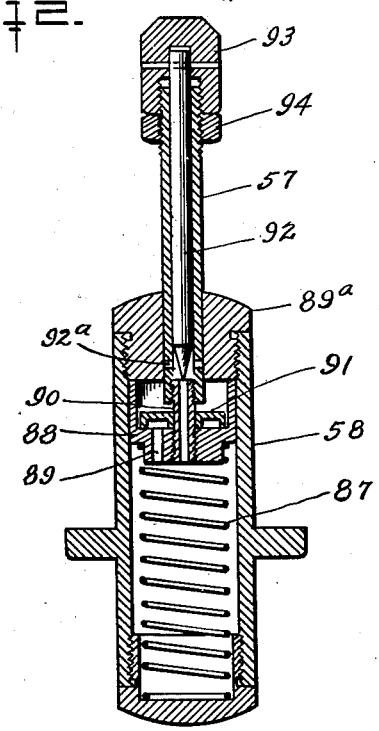

Figures 12 and 13 illustrate a modified means for controlling the supply of oil to the metering pump and in this case the oil valve casing 9 and parts associated therewith are omitted and a valve casing 76, is substituted in lieu thereof. In this form a commercial type of rotary valve is employed arranged between the valve chamber in communication with the oil or fuel supply pipe 22, and the chamber in communication with the discharge pipe 23. This type of rotary valve contains a plurality of transverse ports adapted to register with corresponding openings in the partition dividing the two chambers just mentioned. This rotating valve in this form of invention is provided with a stem 77 passing through the discharge chamber and rigidly secured to the adjacent end of the motor casing trunnion 13, and the ports in the rotating member are so arranged that when the motor casing is in the position illustrated in Figure 13, when the motor is at rest, the valve is closed but upon the operation of the motor and the casing 6 assumes the position shown in Figure 7, the ports in the valve will register with the ports in the partition whereby the liquid fuel or oil will be delivered to the metering pump and this delivery will only continue while the motor is in operation.

As shown in Figure 6, the mixing pump 20 is mounted on the housing 10 which encloses the bearings 17 for the driving shaft 16, and the housing 10 is mounted upon the side of the fan housing 5 opposite the motor. The housing 10 also affords means for admitting air from the interior of the fan housing 5 to the mixing pump 20 whereby the operation of the mixing pump forces in addition to the metered fuel from the metering pump 21, an amount of air through pipe 25 to the mixture pipe 26 whereby a small percentage of oil is discharged through a large nozzle opening in the form of a spray. The housing 10 is provided with a passage 77$^a$ leading from the mixing pump 20 to an annular baffle supported at the end of the housing 10 opening into the fan housing 5. This baffle comprises spaced apart annular walls 78 and 79 which walls are secured upon opposite sides of an I shaped dividing partition 80. Within the housing 10 an annular chamber 81 is provided which is closed by the disc 79. Air from the fan housing enters the chamber 81 by way of the port 82 in the baffle, as indicated by the arrow. It then enters the space between the plate 79 and the partition 80 through the port 83 in said plate, as indicated by the arrow. The air passes from this space by way of the port 84 through the center partition 80 into the space on the opposite side, as indicated by the arrow, and from that space it passes through a plurality of small holes 85 in the tubular member 86 passing through the baffle, one end of which opens into the passage way 77 leading to the mixing pump and the other end of which is closed and secured to the fan side of the plate 78.

The tortuous passage of the air in passing from the interior of the fan housing to the mixing pump as provided by this particular type of baffle acts as a muffler for the noise which would otherwise occur by atmospheric air being drawn into the rapidly revolving mixing pump.

The dash pot 58 illustrated in Figures 6,7,9, 11 and 13 is illustrated in the enlarged detail sectional view shown in Figure 14. As heretofore described the stem 57 of the dash pot 58 is depressed by the lever 56 when the motor starts to operate. The lever 56 tilts the mercury tube 63 to close the ignition circuit and after the lever 56 has traveled a certain distance in connection with the lever 55 it is released and the dash pot slowly returns the lever 56 to its horizontal position thereby tilting the mercury tube switch 63 to break the ignition circuit. It is usually desirable to be able to adjust the time between the closing and opening of the ignition circuit and for this reason it is preferable to employ the improved dash pot as illustrated in Figure 14. The casing 58 is closed at the lower end and a coil spring 87 resting upon the closed lower end normally acts upon the piston 88 to force it against the cap 89ª closing the upper end. The piston 88 is provided with a port 89 and is recessed, as shown in Figure 14, to provide upwardly extending cylindrical walls. The stem 57 is hollow or is tubular in form and is mounted to reciprocate in the cap 89. The interior of the lower end of the stem 57 is screw threaded about a tubular member 90 which passes through and is secured to the piston 88. About this tubular member 90 is carried an annular plate 91 loosely received between the cylindrical walls and slidably mounted upon the tube 90 and is adapted to normally allow the air or liquid in the casing below the piston to pass through the port 89 when the stem 57 is depressed against the action of the spring 87, and upon an upward movement of the piston to close the said port. An adjustable needle valve 92 is mounted within the hollow stem 57 terminating in a conical portion adapted to seat upon the bore of the tube 90. The hollow stem 57 is provided with a plurality of ports 92ª arranged between the upper end of the tubular member 90 and the cylindrical portion of the needle valve 92. The needle valve 92 passes beyond the upper end of the stem 57 and is secured to a rotatable head 93 which is in screw threaded engagement with the upper end of the stem 57 as shown. A lock nut 94 is also screw threaded upon the stem 57 for maintaining the adjustment of the needle valve when set. When the cylindrical walls of the piston 88 contact with the under side of the cap 89ª the ports 92 are closed by the said cap. The depression of the stem will cause the piston to descend at a constant rate as the fluid therebelow passes through the port 89 to the upper side thereof. When the means depressing the piston is removed, by the proper adjustment of the relation of the needle valve to its seat in the tubular member 90 the rate of upward travel of the piston caused by the spring may be regulated in accordance with the flow of the fluid above the piston through ports 92 and bore of the member 90.

What I claim is:

1. In an electrically operated liquid fuel burning device, a motor therefor having a rotor mounted in a casing upon trunnions, a normally closed fuel valve therefor, and means actuated by rotation of the casing to open said fuel valve caused by energization of the motor.

2. In an electrically operated liquid fuel burning device, a motor therefor having a rotor mounted in a casing upon trunnions, a normally closed fuel valve therefor, and means actuated by rotation of the casing to open said fuel valve caused by energization of the motor, said means maintaining the said valve open during the operation of the motor.

3. In an electrically operated liquid fuel burning device, a motor therefor, having a rotor mounted in a casing upon trunnions, an electric circuit for the motor, an ignition device for the liquid fuel and means actuated by the rotation of the casing to operate the ignition device to ignite said fuel caused by energization of the motor.

4. In an electrically operated liquid fuel burning device, a motor therefor having a rotor mounted in a casing upon trunnions, an electric circuit for the motor, an ignition device for the liquid fuel, and means actuated by rotation of the casing to operate the ignition device to ignite said fuel caused by energization of the motor, said means after the said ignition device has operated for a predetermined time adapted to discontinue the operation of said ignition device.

5. In a control for an electrically operated liquid fuel burning device, a motor therefor having a rotor mounted in a casing, said casing mounted to freely turn on trunnions, a fuel valve for the liquid fuel normally closed when the device is not operating, and means carried upon said casing adapted to open said valve by the movement of said casing caused by energization of the motor.

6. In a control for an electrically operated liquid fuel burning device, a motor therefor having a rotor mounted in a casing, said casing mounted to freely turn on trunnions, a fuel valve for the liquid fuel normally closed when the device is not operating, and means carried upon said casing adapted to open said valve by the movement of said casing caused by energization of the motor, said means maintaining said valve open during the operation of the motor.

7. In a control for an electrically operated liquid fuel burning device, a motor therefor, a motor circuit, an electrical ignition device, an ignition circuit therefor, said motor having a rotor mounted in a casing, trunnions upon said casing, bearings for said trunnions, said ignition circuit being open while the motor is at rest, means for closing the ignition circuit, and means adapted to close said circuit closing means actuated by the movement of said casing caused by energization of the motor.

8. In a control for an electrically operated liquid fuel burning device, a motor therefor, a motor circuit, an electrical ignition device, an ignition circuit therefor, said motor having a rotor and a casing therefor, trunnions upon said casing, bearings for said trunnions, said ignition circuit open while the motor is at rest, means for closing the ignition circuit, and means adapted to close said circuit closing means actuated by the movement of said casing caused by energization of the motor, said means automatically opening said circuit closing means a predetermined time after the starting of the motor.

9. In a control device, an electric motor having a rotor mounted in a casing mounted upon trunnions, a control instrumentality, and means actuated by the movement imparted to the trunnions caused by energization of the motor to operate the control instrumentality.

10. In an electrically operated liquid fuel burning device, a motor therefor, an electrical ignition device to ignite the liquid fuel, an ignition circuit, a switch in the ignition circuit, means actuated by the operation of the motor to first close the switch and after a predetermined time allow the switch to be opened, said means including an operating arm adapted to be actuated by the starting of the motor, a pivoted main lever connected by a link to said arm, a switch operating lever pivoted concentric with said main lever and a releasable connection between the two levers, means actuating said switch carried upon the operating lever, a dash pot opposing the movement of the operating lever in unison with the main lever and slowly returning it to normal after released from said main lever, means for adjusting the speed of return and means for releasing said operating lever after it has traveled a predetermined distance with said main lever.

PHILIP A. CELANDER.